Figure 13:
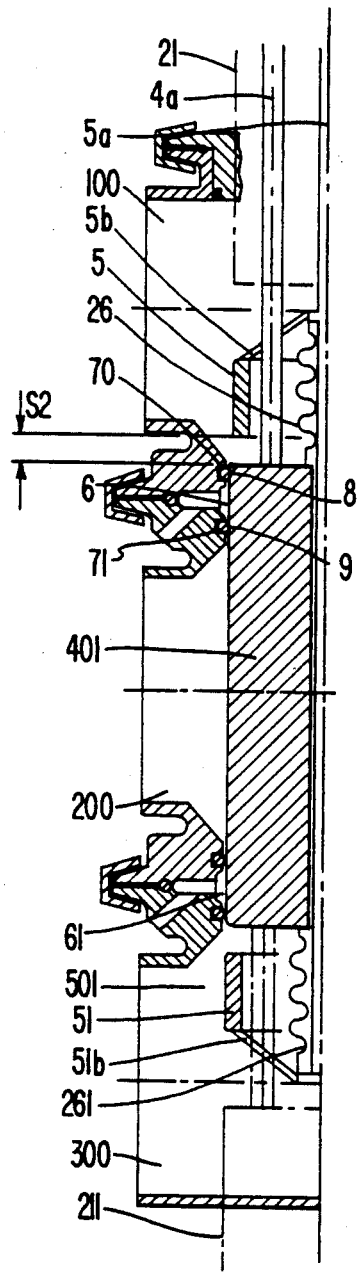

United States Patent [19]

Mieth

[11] Patent Number: 4,995,416

[45] Date of Patent: Feb. 26, 1991

[54] PROCESS FOR CONTROLLING THE MEDIUM INLET INTO AT LEAST ONE LEAKAGE CAVITY OF A VALVE AND AN APPARATUS FOR ITS PERFORMANCE

[76] Inventor: Hans O. Mieth, Sandkrug 3,, D-2058 Schnakenbek, Fed. Rep. of Germany

[21] Appl. No.: 399,462

[22] PCT Filed: Jan. 17, 1989

[86] PCT No.: PCT/EP89/00045

§ 371 Date: Aug. 31, 1989

§ 102(e) Date: Aug. 31, 1989

[87] PCT Pub. No.: WO89/06764

PCT Pub. Date: Jul. 27, 1989

[30] Foreign Application Priority Data

Jan. 20, 1988 [DE] Fed. Rep. of Germany ....... 3801569

[51] Int. Cl.$^5$ .................... F16K 3/00; F16K 11/065; F16K 51/00
[52] U.S. Cl. ....................... 137/1; 137/312; 137/614.13; 137/625.48; 137/627.5; 251/335.3; 251/900
[58] Field of Search .............. 137/312, 625.18, 625.48, 137/627.5, 614.13, 614.11, 614.18, 1; 251/900, 335.3

[56] References Cited

U.S. PATENT DOCUMENTS

| | | | |
|---|---|---|---|
| 2,485,504 | 10/1949 | Morgan | 251/900 |
| 3,819,152 | 6/1974 | Clippard, III | 251/900 |
| 3,938,543 | 2/1976 | Sorenson | 137/312 |
| 3,973,583 | 8/1976 | Sorenson | 137/312 |
| 4,314,579 | 2/1982 | Wheatley et al. | 137/312 |
| 4,418,711 | 12/1983 | Stoll et al. | 251/900 |
| 4,566,479 | 1/1986 | Rotte et al. | 137/312 |

FOREIGN PATENT DOCUMENTS 3701027 7/1988 Fed. Rep. of Germany .

*Primary Examiner*—George L. Walton
*Attorney, Agent, or Firm*—Lane, Aitken & McCann

[57] ABSTRACT

The invention relates to a process for controlling the medium inlet into at least one leakage cavity of a valve according to the opening part of claim 1. When applying the proposed process to a polyway-switching valve, the construction of which is novel per se, a valve is created which is novel with view to the switching function and with view to its properties, in particular the leak-proof property of each individual seat region. In the procedural technique this is inter alia achieved in that in the valve position deviating from the normal position there is provided at each switched valve seat a substitution of the closing member or shutter element by the respective other one for shutting off the leakage cavity from the inner space.

16 Claims, 6 Drawing Sheets

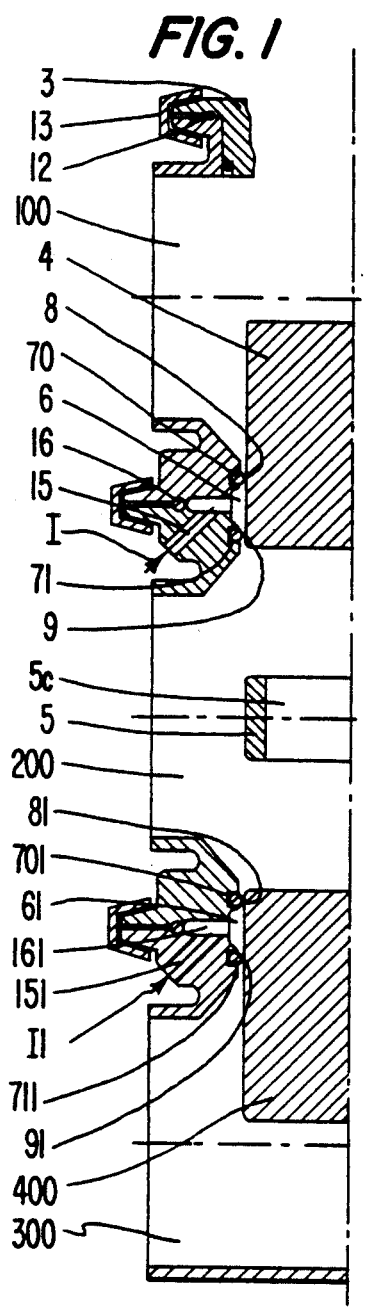
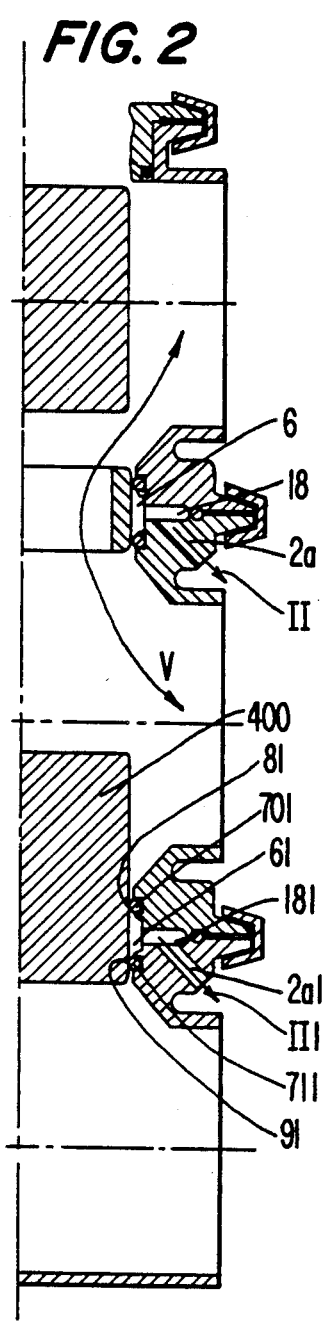
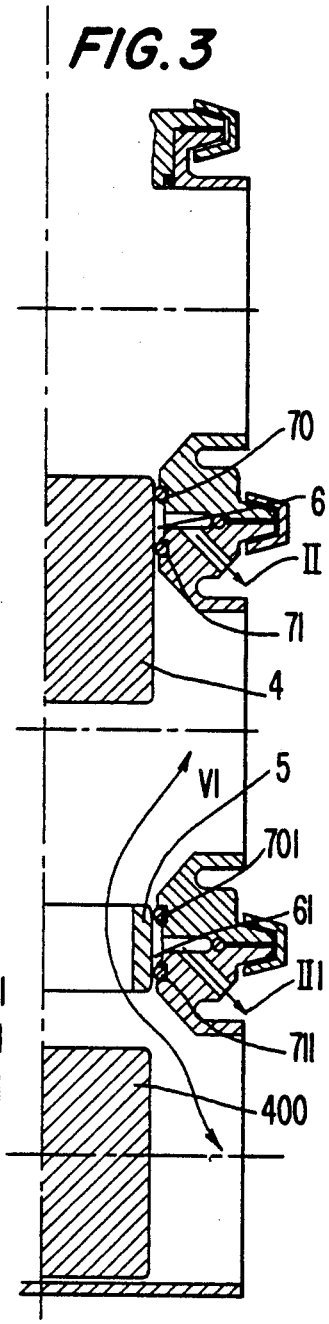

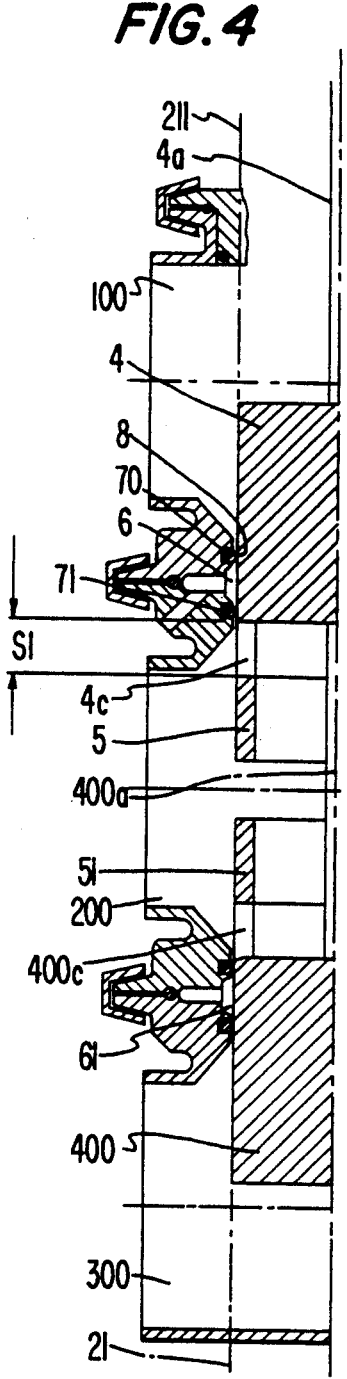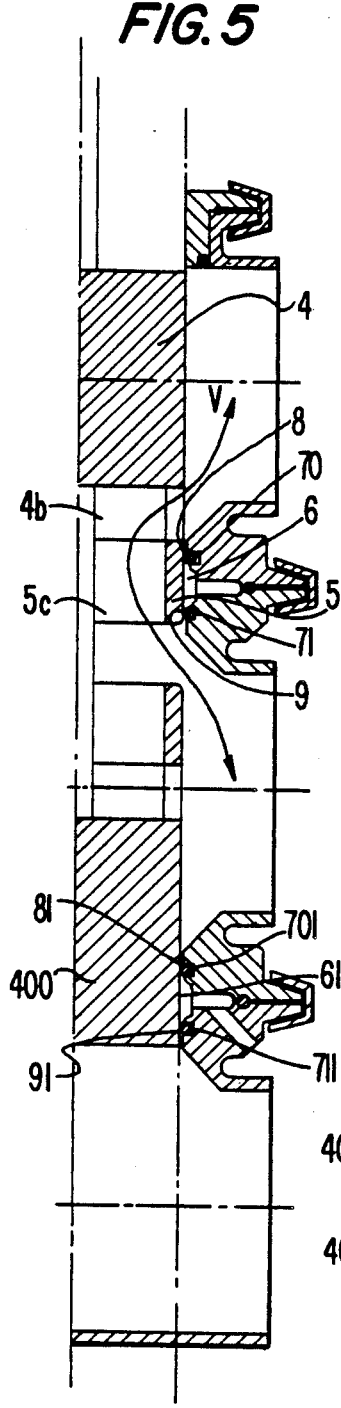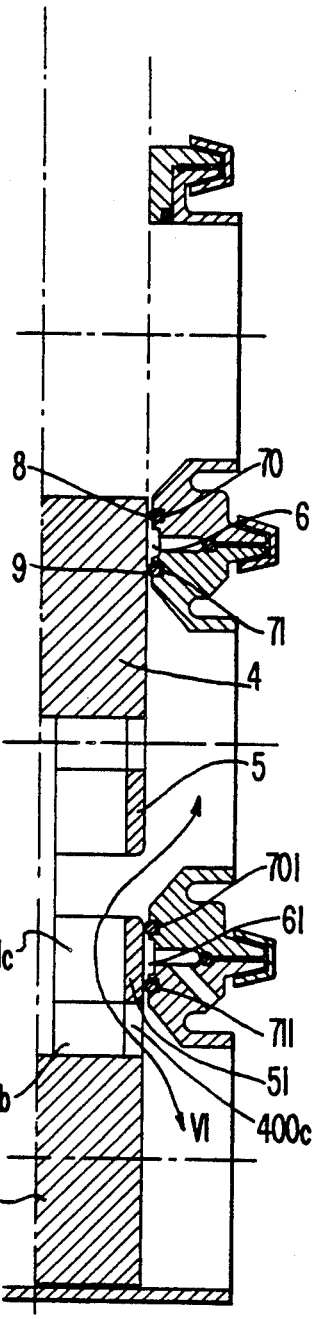

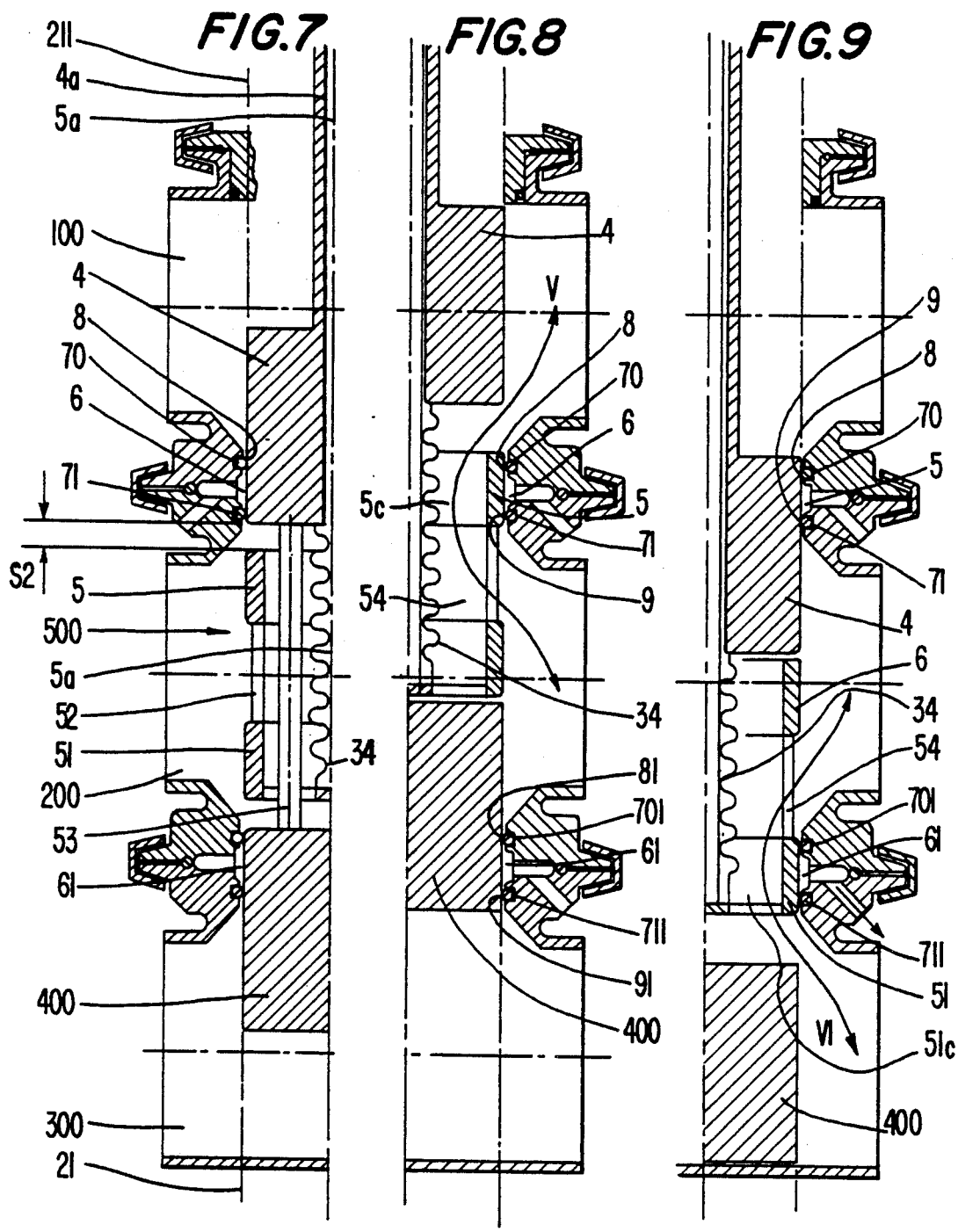

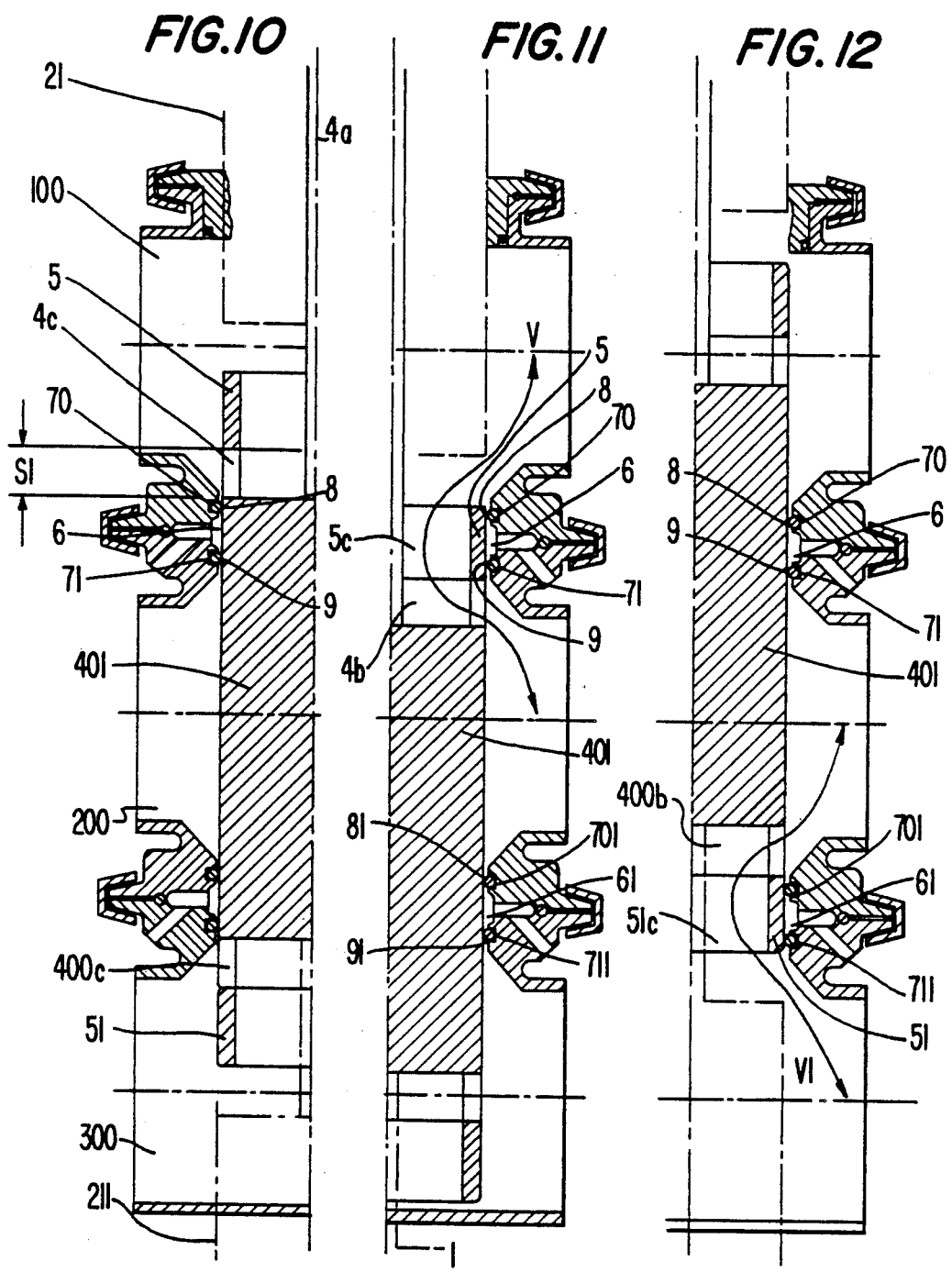

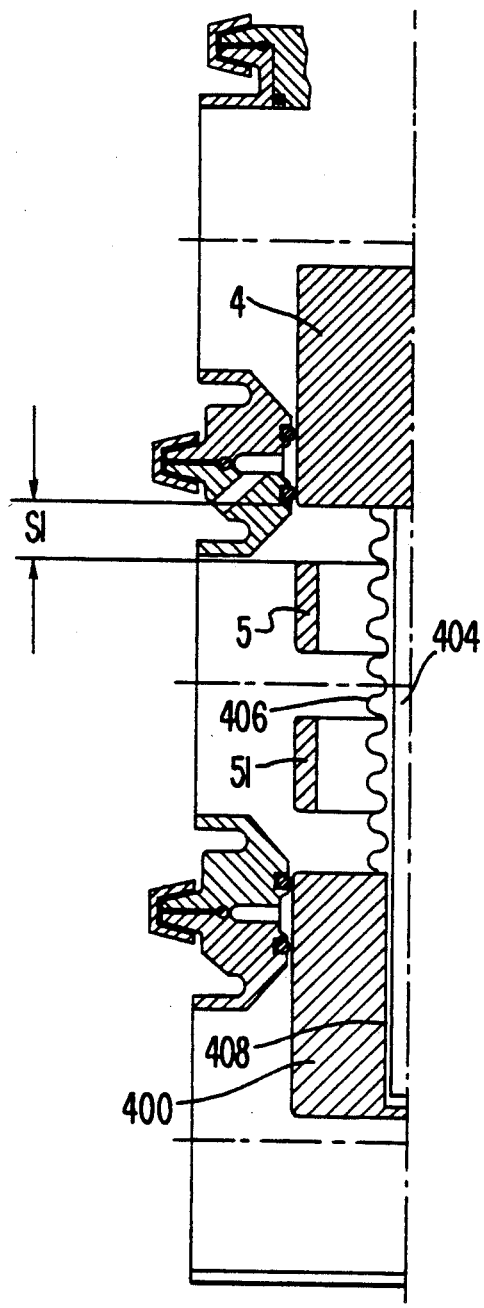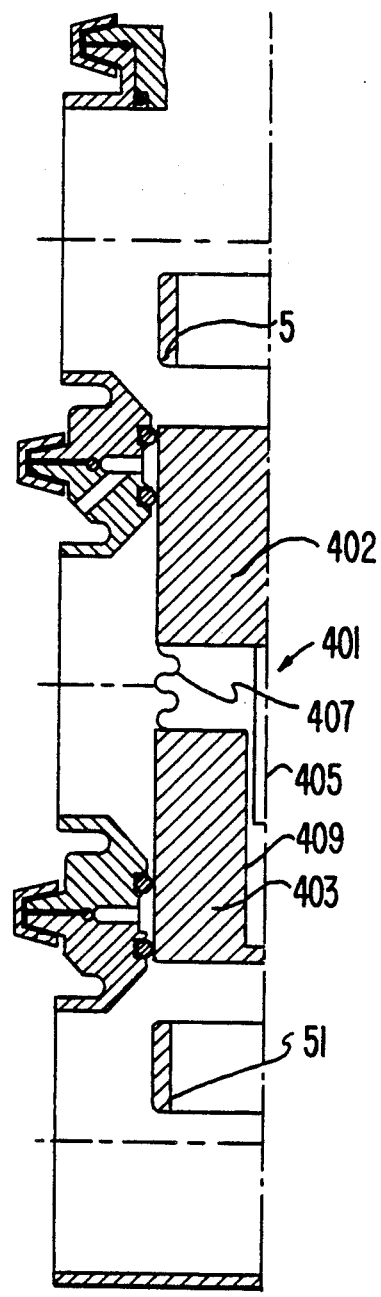

PROCESS FOR CONTROLLING THE MEDIUM INLET INTO AT LEAST ONE LEAKAGE CAVITY OF A VALVE AND AN APPARATUS FOR ITS PERFORMANCE

The invention relates to a process for controlling the medium inlet into at least one leakage cavity of a valve and an apparatus for its performance.

The state of the art known so far in the field of the so-called leak-proof polyway-switching valves can e.g. be gathered from DE-PS 20 27 792. In the cleansing position and/or the sterilizing position, this valve satisfies (cp. column 5, lines 40 et seq.) the minimum requirement to be met, namely that there must exist, at any time, at least two seals between the filling material to be packed and e.g. a cleansing agent for the vessels, and that the space between the seals is to be rinsed with the cleansing agent. In analogy with field of pneumatics, the known valve constitutes a so-called 4/2-way valve, since it is provided with four connections (three casing connections, one leakage cavity connection) and two switching positions. There is not given a normal position in which the valve, as seen from the middle valve casing part, is either open or closed at both sides. From FIG. 2 of the above cited reference, it is furthermore evident that in the illustrated filling position of the valve there exists only a simple sealing between the middle valve casing part 3 and the lower valve casing part 4. While in this position, product is transferred from the upper valve casing part 2 to the middle valve casing part 3, and pressurized cleansing agent can basically stand in line in the lower valve casing part 4. In this case a defective sealing in the lower seat region or an impact of pressure from the lower valve casing part 4 would lead to a mixing of product and cleansing agent, since the lower seat region is not protected against leakage.

German patent application No. P 37 01 027.1 furthermore describes a valve with a leakage cavity, which is provided with two sealing places disposed in series and in the closed position of the valve prevents the overflow of fluids from one valve casing part into another. There the leakage cavity is disposed between the sealing places and connected with the environment of the valve via the valve casing. With this so-called double seat valve, the technical problem of controlling the medium inlet from the inner space to the leakage cavity not only in the closed position of the valve but also in other positions of the valve is solved. The solution of the procedural problem is achieved by controlling the connection between the leakage cavity and the inner space in positions other than the closed position of the valve with the same effect and in the same manner as in the closed position by means of an arrangement providing a substitution for the closing member with respect to its interaction with the leakage cavity. With a view to the concrete realization of this substitution there is inter alia provided a shutter element which, with respect to the closing member, is disposed in relatively mobile relation in the direction of the degree of its freedom of motion and controls the connection between the leakage cavity and the inner space of the valve casing parts. In the course of this, at least in the open position of the valve, the shutter element is in permanent contact with the two sealing places, these sealing places comprising sealing means disposed on the side of the valve casing, or on the side of the closing member or the shutter element, respectively.

From the above mentioned German patent application there is also known a sealing arrangement comprising two separate seals disposed on the side of the valve casing; in the Euro-PCT-application (WO 88/05512) claiming the priority of said German patent application, these two discrete seals inter alia are seals with an annular cross section.

Starting out from the prior art shown, it is the object of the invention to create a process for the control of the medium inlet into at least one leakage cavity of a valve, wherein the valve comprises more than two valve casing parts with feed and drain casing parts and in particular has controllable connections between the leakage cavity and the inner space of the valve casing.

The problem is solved by providing a normal position in which the valve as seen from the middle valve casing part is either open on both sides (5/3-way valve) or open on one side (5/2-way valve) or closed on both sides (5/3-way valve), and by providing a position deviating from the normal position in which there is provided, at each switched valve seat, a substitution of a closing member or locking element for, respectively, a moved locking element or closing member to shut off the leakage cavity from the inner space of the valve casing. Accordingly, the process according to the invention provides the valve with switching functions and properties which are novel and advantageous.

With the proposed invention it is possible to realize a complex valve with three valve casing parts, five connections and three switching positions. When designing a specific seat region with one leakage cavity opening between two seals, this results in a novel assembly unknown hitherto with which a switching function becomes possible which was unknown so far to be realizable with known valves of this structure, namely the simultaneous closing position of two outer valve casing parts with respect to a middle casing part, and wherein additionally one leakage cavity each is provided between two adjacent valve casing parts. In analogy to the classification of valves in the technology of pneumatics, this novel valve constitutes a so-called 5/3-way valve. Such a valve comprises five connections and 3 positions (A, B, C). In the middle position A, the so-called normal position, and depending on the dimension of the closing members, the middle valve casing part can be closed or open on both sides, respectively, with respect to the outer valve casing parts. In the two other positions B and C, there results a switching function between the middle valve casing part and the respective connected outer valve casing part. The connection of the middle valve casing part and of the outer valve casing parts is identified with 1, 2, and 4 in accordance with the known nomenclature, while two further connections are designated 3 and 5. From the table shown below it can be seen which switching position is assumed by the respective connections 1 to 5 in the positions A, B and C. A closed connection is designated with "0", an open connection with "1".

| Connection | Switching states of a 5/3-way valve according to the state of the art | | |
|---|---|---|---|
| | Position | | |
| | A | B | C |
| 1 | 0 | 1⎤ | 1⎤ |
| 2 | 0/1⎤ | 1⎦ | 1⎦ |
| 3 | 0/1⎦ | ⎡1 | 0 |
| 4 | 0/1⎤ | ⎣1 | 1⎤ |
| 5 | 0/1⎦ | 1 | 1⎦ |
| | */** | | |

*closed in normal position A
**open in normal position A

From the above table it becomes evident that such valves exist "closed" in the normal position or "open" in the normal position (cp. column A). It further becomes evident which connections of the 5/3-way valve are connected to each other in the B-position or in the C-position.

In the subject matter of the application, which, as already explained above, is a 5/3-way valve in view of the number of connections and switching positions, each of connections 3 and 5 constitutes the connection of the leakage cavity to the inner space of the valve casing. According to the invention this connection is always closed, in the closed position as well as in the open position of the valve. The table shown below exhibits the switching states of the subject matter according to the invention in analogy to the nomenclature known from pneumatics.

| Connection | Switching states of the valve according to the invention | | |
|---|---|---|---|
| | Position | | |
| | A | B | C |
| 1 | 0/1⎤ | 1⎤ | 1⎤ |
| 2 | 0/1⎦ | 0 | 1⎦ |
| 3 | 0 | 0 | 0 |
| 4 | 0/1⎦ | 1⎦ | 0 |
| 5 | 0 | 0 | 0 |
| | */** | | |

*closed in normal position A
**open in normal position A

From the above table, it is evident that, in the valve according to the invention, the connections 1, 2 and 4 (connection 1 for the middle valve casing part; connections 2 and 4 for the respective outer valve casing parts) are switched in the same manner as in the 5/3-valve according to the state of the art. In position B connection 1 is switched through to connection 4, and in position C connection 1 is switched through to connection 2. Identity between the two solutions furthermore occurs in the switch position "closed in normal position". While in the 5/3-way valve according to the state of the art, in position B connection 2 is connected with connection 3, and in position C connection 4 is connected with connection 5, in the valve according to the invention connections 3 and 5 (connection of the leakage cavity to the inner space of the valve casing) always remain closed also in these positions.

When comparing the two valves with respect to the condition "normal position open", no concurrence will be found. While connection 1 in the valve according to the state of the art remains closed and connections 2 and 3 or 4 and 5 are connected to each other, it is evident from the subject matter according to the invention that there connections 1, 2 and 4 are connected to each other, while the connections of leakage cavities 3 and 5 are, as intended, in closed position.

From the last mentioned table it becomes evident that the valve proposed according to the invention constitutes a 5/3-way valve which is not available in this configuration and with the above-mentioned properties in the field of valves, in particular in the field of the food and beverage industry. Apart from the function as switching valve, there exists a normal position in which the valve is either closed or open. Furthermore the valve is leakproof in each seat region.

Starting out from the requirements for the actual use, either both the leakage cavities or one of the two leakage cavities can be dispensed with in accordance with an embodiment of the valve according to the invention comprising three valve casing parts. Thus there is achieved a polyway-switching valve without or with only one leakage-safeguard in one of the two seat regions between adjacent valve casing parts. For the case in which the leakage cavity is omitted in one seat region, the shutter element will substitute the closing member with respect to its interaction with the seal.

The valve proposed according to the invention when applied to the problem of the above-mentioned publication DE-P 20 27 792 can easily be changed to a so-called 5/2-way valve by dimensioning the closing member correspondingly and omitting the normal position, leading to a solution wherein also the lower valve seat is leakproof.

While already the omission of the normal position in the valve according to invention leads to a 5/2-way valve meeting the above requirements, it is possible in contrast to the known valve to modify the valve according to the invention to a real 5/2-way valve by dimensioning the length of the closing member accordingly, since it is easily possible to dimension the valve such that on the one hand the closing member assumes a closed position before giving up the closed position on the other hand. In any case, in a switching run of the known polyway-switching valve, an intermediate position must be accepted wherein the middle casing part 3 is simultaneously connected with the two outer valve casings 2 and 4.

In the valve proposed according to the invention, the connection element(s), that is locking element(s), can be disposed between the two closing members. Alternatively there is also feasible a solution where there is at least one shutter element each on both sides of a single closing member. In the first mentioned case, closing members as well as the shutter elements can be connected to each other, so that in an unrestricted function of the valve merely two drive motions from outside are necessary. In the second case, the same advantages are obtained regarding the design of the drive of such a valve.

While the above-mentioned valve allows unrestricted, leakage-free switching, a further embodiment of the valve according to the invention makes it possible to switch the valve with only one single drive motion, however, dispensing with leakage-free switching, i.e. tolerating a restricted switching leakage. This is achieved by the shutter elements being fixedly connected with the closing member in spaced relation.

A further embodiment of the valve according to the invention proposes to combine the shutter elements, when disposed at the inside and between the closing members, to one shutter element unit which is displaced via a bar in relatively mobile relation to the closing member. The passage of the bar through the closing member can be closed by a bridging material in simple manner and under favorable conditions by means of a bellows.

Another embodiment of the valve according to the invention provides that in its axial extension the closing member is modified by arrangements operating like a telescope, the distance between the closing members being bridged material closed by a flexible connection element. Through this measure it becomes possible to furnish the valve with an ambivalent normal position, namely the normal position "closed" or the normal position "open". The largest axial extension of the closing member in the normal position of the valve is to be dimensioned such that the closing member covers both seat regions including the total respective leakage cavities.

In its shortest axial extension the valve in its normal position is open on both sides as seen from the middle valve casing part.

When using the valve according to the invention a further, not unimportant advantage occurs if e.g. a tank discharge is connected to the middle casing part and the outer valve casing parts are connected with conduits. While with the conventional assemblies of polyway-switching valves all regions of the polyway-switching valves in contact with the product were reached only if either both or at least the further off conduit was charged with cleansing agent from the tank, all regions of the valve proposed according to the invention are already reached when one of the two conduits is cleaned from the tank.

Examples of embodiments of the invention are illustrated in the drawing and explained in detail hereinafter.

Figure 14:
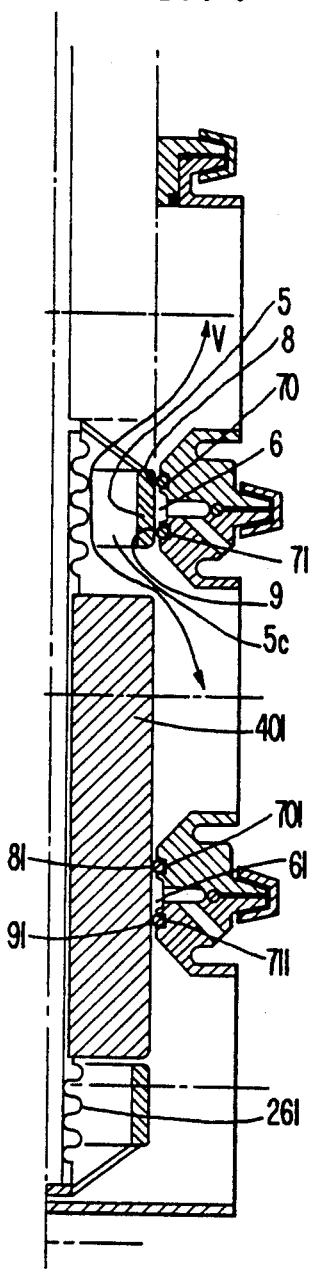
Figure 15:
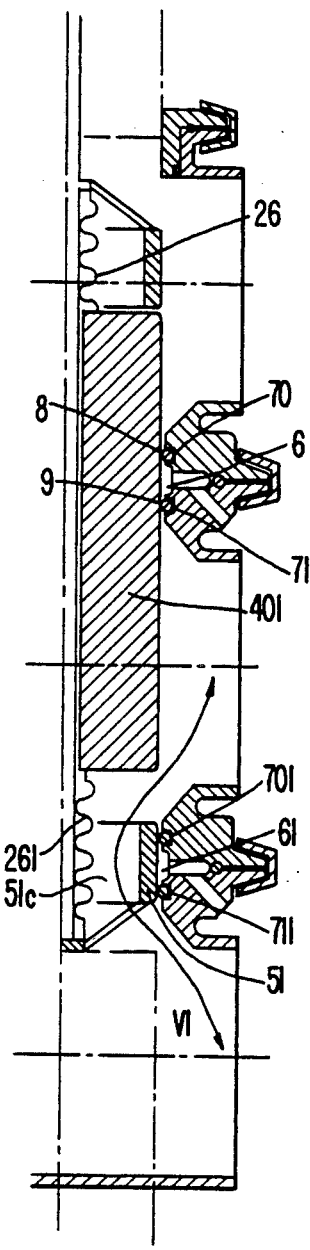

There are shown in:

FIGS. 1 to 3—in simplified schematic illustration a center section through the valve according to the invention in the three switching positions possible (FIG. 1: in normal position A closed; FIG. 2 and FIG. 3: the two other open positions B, C), with a single shutter element being disposed at the inside of the two closing members;

FIGS. 4 to 6—a center section through another embodiment of the valve according to the invention, also in the three switching states possible, wherein two shutter elements are disposed at the inside of the two closing members and wherein a fixed connection of all shutter elements and closing members to each other is provided;

FIGS. 7 to 9—a center section through a further advantageous embodiment of the valve according to the invention in the three switching states possible, wherein the shutter elements and the closing members with respect to number and arrangement, correspond to the embodiment according to FIGS. 4 to 6, however, a relative mobility between shutter elements and closing members being provided;

FIGS. 10 to 12—a center section through a further embodiment of the valve according to the invention in the three switching states possible, wherein the shutter elements are disposed at both sides of a single closing member and firmly connected thereto;

FIGS. 13 to 15—a center section through a further advantageous embodiment of the valve according to the invention in the three switching states, similar to FIGS. 10 to 12, wherein there is provided a relative mobility of the shutter elements with respect to the closing member;

FIG. 16 and FIG. 17—in a substantially simplified, schematical illustration a center section through another embodiment of the means according to the invention in its normal position, wherein the axial extension of the closing member can be modified in a telescope-like manner (FIG. 16: closing members arranged outside the shutter elements; FIG. 17: closing member arranged inside the shutter elements).

| List of designations | |
|---|---|
| 100, 200, 300 | Valve casing parts |
| 2a/2a1 | Drain outlet |
| 3 | Casing closing part |
| 4/400/401 | Closing member |
| 4a/400a | Bar |
| 4b/400b | Apertures |
| 4c/400c | Connection bridges |
| 402 | First closing member element |
| 403 | Second closing member element |
| 404 | First telescopic bar |
| 405 | Second telescopic bar |
| 406 | First flexible connection element |
| 408 | First guide bore |
| 409 | Second guide bore |
| 5/51 | Shutter element |
| 501/500 | Shutter element unit |
| 5a | Bar |
| 5b/51b | Bridges |
| 5c/51c | Passage opening |
| 52 | First connection element |
| 53 | Second connection element |
| 54 | Second passage opening |
| 6/61 | Leakage cavity |
| 70/701 | First seal |
| 71/711 | Second seal |
| 8/81 | First sealing place |
| 9/91 | Second sealing place |
| 12 | Casing seal |
| 13 | Connection means |
| 15/151 | Connection port |
| 16/161 | Channel |
| 18/181 | Collection channel |
| 21/211 | First compensation piston |
| 26/261 | First bellows |
| 34 | Bellows |
| I/I1 | Inlet of the cleansing fluid |
| II/II1 | Drain of the cleansing fluid Leakage |
| V/V1 | Passage or pipe flow |

FIG. 1 shows a valve with a shutter element 5 disposed inside the between the two closing members 4 and 400. The valve with the three casing parts 100, 200 and 300 is in its normal position A, in which it is closed on both sides as seen from the middle valve casing part 200.

In FIGS. 2 and 3 the two open positions B and C of the valve are shown, wherein in FIG. 2 the upper closing member is in its open position and shutter element 5 replaces the closing member with respect to engaging seals 70 and 71. The lower closing member 400 is dimensioned such that in the switching position shown it has not yet left the lower seat region, still engaging seals 701 and 711.

In FIG. 3 the lower closing member 400 is in its open position and, the sole shutter element 5 has replaced the closing member in a closed position with respect to seals 701 and 711. Thereby the upper closing member 4, in the same manner as the lower one, is dimensioned such that valve casing parts 100 and 200 are still sealed from each other. In each case, the seals 70 and 71 or 701 and 711 are contacted either by closing member 4 or 400 or by shutter element 5. Between seals 70 and 71 there is leakage cavity 6 and between seals 701 and 711 there is leakage cavity 61. By the kind of hatching in FIGS. 1 to 3, it is indicated that, in each of the switching states shown, closing members 4 and 400 have the same distance from each other, so that it is possible to connect and actuate them via one single bar (not shown) advanced from outside the valve. Shutter element 5 requires its own drive, the necessary switching stroke of which is shorter than that for the closing members. Shutter element 5 with its passage opening 5c allows the passage of flow V, above called "inner passage", from the middle casing part 200 to the upper casing part 100 or vice versa.

In the position of shutter element 5 as shown in FIG. 3 the respective passage flow via the passage opening 5c is designated V1. The structure and function of the remaining structural elements in the area of the valve casing parts 100 and 200 are known from German patent application No. P 37 01 027.1 and from the Euro-PCT-Application No. WO 88/05512 claiming the priority of the aforementioned patent application. This is particularly true for a casing closing part 3, a casing seal 12 and a connection means 13, a first and a second sealing place 8 and 9, respectively, a connection port 15, a channel 16 and a collection channel 18, and a drain outlet 2a, from which the cleansing liquid or leakage designated by II penetrates. The inlet of the cleansing liquid via connection port 15 is designated by I.

The seat region provided between valve casing parts 200 and 300 is completely identical to that between valve casing parts 100 and 200. As distinguished from the equal parts in the upper seat region, the parts in this seat region are designated by adding the numeral 1 to the designations as known from the above patent applications (P 37 01 027.1; WO 88/05512). A description of the lower region of the known valve therefore is dispensable.

Nevertheless the valve illustrated in FIGS. 1 to 3 does not simply represent a cumulation of two valves known per se from the above-mentioned patent applications. Apart from the fact that already the combination of the two valves known per se, as already explained above, forms a completely new valve, the substantial difference over the mere combination resides in that there are provided one single shutter element 5 only and closing members 4 and 400 coupled to one another, due to which the complex valve can manage with merely two different drive motions, which are generated by means not shown.

In FIGS. 4 to 6 there is shown another embodiment of the means according to the invention in the three switching states possible, the latter corresponding to those of FIGS. 1 to 3. Valve casing parts 100, 200 and 300 and the pertinent structural parts are identical with those according to FIGS. 1 to 3. Therefore, a complete enumeration with reference numerals was dispensed with in these and the subsequent figures. Although elements 4 and 400, 6 and 61, 8 and 81, 9 and 91, 70 and 701, 71 and 711 are still identified in detail, they need not be referred to once more with respect to their purpose since they were already explained in the description of FIGS. 1 to 3. In contrast to the embodiment according to FIGS. 1 to 3, a second shutter element 51 is provided in addition to locking element 5 in the embodiment according to FIGS. 4 to 6. By way of example, shutter element 5 is firmly connected with closing member 4 via a connection bridge 4c, and locking element 51 is firmly connected with closing member 400 via a connection bridge 400c, each at a distance s1. Since the upper closing member 4 in turn is fixedly connected with the lower closing member 400 via a bar 400a, the illustrated valve can be switched by means of a single drive motion, which is generated by means not shown. The switching movement from the closed to the open position, however, is not performed leakage-free, since between the shutter element and the closing member 5, 51 or 4, 400 the above mentioned distance s1 exists. Apart from their connecting function, it is a task of connection bridges 4c and 400c to fix the respectively associated seals 70, 71 or 701, 711 in their necessary positions during the switching movement from the closed to the open position or vice versa. In one open position, as shown in FIG. 5, the passage flow designated V flows from the valve casing part 200 via passage opening 5c and the openings 4b into the upper valve casing part 100. In the other open position, as shown in FIG. 6, the passage flow V1 flows in corresponding manner via a passage opening 51c and openings 400b formed between the connection bridges 400c, from the middle valve casing part 200 into the lower valve casing part 300 or vice versa. The interrupted lines 21 and 211 characterize possible compensation pistons with which the valve can be equipped and which take care of a complete pressure compensation at closing member 4, 400.

In the embodiment according to FIGS. 7 to 9, the same designations are used as in the embodiment according to FIGS. 4 to 6, and the structural elements designated, such are of identical structure and function. In the following description of the figures, therefore, reference is made only to the differences in the embodiments. The two closing members 4 and 400 are connected to one another at least via one second connection element 53 disposed eccentrically. The drive of the upper closing member 4, and thus also of the lower closing member 400, is produced via a bar 4a, which is a hollow bar. A bar 5a, connected with a shutter element unit 500, is guided in said hollow bar. The shutter element unit 500 consists of the two locking elements 5 and 51, which in turn are firmly connected to one another by means of a first connection element 52. The shutter element unit 500 is disposed in relatively mobile relation with respect to the closing members 4, 400 and can be displaced by a total of the two-fold distance s2. Said two-fold distance s2 results from an aperture cross section corresponding approximately to the nominal cross section of the valve, the aperture cross section being formed in the respective open positions of the valve between the shutter element 5 or 51 and the respectively associated closing member 4 or 400. A penetration gap, which is not defined in more detail, formed between bar 5a and closing member 4, is bridged material closed via a bellows 34. Apart from the passage openings 5c or 51c provided in shutter elements 5 or 51 for the already mentioned passage flow V or V1, there are provided second passage openings 54 between the first connection elements 52, through which the above mentioned passage flows V and V1 can penetrate from the shutter element unit 500 into the valve casing part 200 surrounding it, or vice versa. The illustrated embodiment realizes switching operations of the valve completely leakage-free. For this purpose there are necessary two independent drive motions of rods 4a and/or 5a, which are activated by not shown means.

FIGS. 10 to 12 show a further embodiment of the valve according to the invention. In the following, reference is only made to the differences over the preceding figures, in particular over FIGS. 4 to 6. As in the embodiment according to FIGS. 4 to 6, the shutter elements 5 and 51 are in fixed connection with the closing member 401, which is combined in one single structural element the shutter element 5 being connected via connection bridge 4c and shutter element 51 being connected via connection bridge 400c. The distance between shutter element 5 or 51 and closing member 401 is again s1. Apart from this, the remaining structure of the valve and its mode of operation are completely identical with that according to FIGS. 4 to 6. A further description and explanation therefore is not necessary.

As far as its fundamental structure is concerned, the embodiment according to FIGS. 13 to 15 is explained by a direct comparison with the embodiment according to FIGS. 10 to 12 and, regarding the function and mode of operation of its shutter elements 5 and 51, by a comparison with the embodiment according to FIGS. 7 to 9. The single closing member 401 is now driven by at least one bar 4a disposed eccentrically. The locking elements 5 and 51 are connected to each other via a bar 5a which is activated by means not shown. Each of shutter elements 5 and 51 is connected with said bar via a bridge 5b or 51b. Locking elements 5 and 51, bar 5a and bridges 5b and 51b together form a shutter element unit 501, which is displaceable with relative mobility against and away from closing member 401.

The displacement distance from one open position of the valve to the other amounts to a total of the two-fold distance s2, which in the open position has an aperture cross section approximately corresponding to the nominal cross section of the valve. Each of an upper and a lower penetration place, which are not designated in detail, between bar 5a and closing member 401 are bridged material closed by means of a bellows 26 or 261. In the normal position of the valve (FIG. 13) said bellows 26, 261 are mounted without tension, while in the open positions of the valve they are alternatingly stretched (26 in FIG. 14 and 261 in FIG. 15) or compressed (261 in FIG. 14 and 26 in FIG. 15).

The valve as shown in FIGS. 1 to 15 can be realized by means of the features for seals, leakage cavities, shutter elements and closing members as well as pertinent controlling parts as known from the above-mentioned patent applications P 37 01 027.1 and WO 88/05512.

FIGS. 16 and 17 show an embodiment of the valve wherein closing member 4, 400 (FIG. 16) and closing member 401 (FIG. 17) are modified in their axial extension by means of assemblies 404, 408 or 405, 409 working telescope-like. 404 designates a telescopic bar and 408 a first guide bore. In FIG. 17 said structural elements are designated by 405 and 409. The distance between closing members 4 and 400 (FIG. 16) or between the first and the second closing member 402 and 403, respectively, is bridged material closed by means of a flexible connection element 406 or 407.

By means of these two embodiments it is possible to design the respective valve in its normal position ambivalent regarding the switching state of the two outer valve casing parts with respect to the middle valve casing part. In the case of a short distance between closing members 4, 400 and 402, 403 the valve is closed in its normal position, in the case of the largest distance possible, it is open in its normal position.

I claim:
1. A valve for controlling the flow of fluid while permitting the isolated inlet of a medium to at least one leakage cavity, comprising:
a casing including a first end casing part, a middle casing part, and a second end casing part arranged in series, said casing defining an inner space;
first sealing means for providing a seal between said first end casing part and said middle casing part, and second sealing means for providing a seal between said middle casing part and said second end casing part, at least one of said first and second sealing means comprising two seals disposed in series;
at least one leakage cavity in the inner space of said casing, said cavity being connected with the environment of the valve between the two seals of one of said first and second sealing means;
closing means engageable with said first sealing means for placing said middle casing part out of communication with said first end casing part and simultaneously engageable with said second sealing means for placing said middle casing part out of communication with said second end casing part, said closing means comprising at least one closing member; and
shutter means selectively engageable with either one of said first and second sealing means for providing fluid communication between a selective adjacent pair of said casing parts, said shutter means comprising at least one shutter member having a through passage, said shutter member selectively engaging one of said first and second sealing means to thereby provide said fluid communication between one of said pairs of adjacent casing parts, and said closing means selectively engaging the other of said first and second sealing means to block fluid communication between the other of said pair of adjacent casing parts, said closing means and said shutter means comprising means for selectively isolating said leakage cavity from the remainder of the inner space of said casing.

2. The valve of claim 1, wherein said first sealing means and said second sealing means comprises two seals disposed in series, and the valve further comprises two leakage cavities, one leakage cavity being connected with the environment of the valve between the two seals of one of said first and second sealing means.

3. The valve of claim 1, wherein said closing means comprises two closing members, a first closing member movable between a first position in engagement with said first sealing means for placing said middle casing part out of communication with said first end casing part and a second position out of engagement with said first sealing means for placing said middle casing part in communication with said first end casing part, and a second closing member movable between a first position in engagement with said second sealing means for placing said middle casing part out of communication with said second end casing part and a second position out of engagement with said second sealing means for placing said middle casing part in communication with said second end casing part.

4. The valve of claim 3, wherein said shutter means is in engagement with said first sealing means when said first closing member is out of engagement with said first sealing means, and said shutter means is in engagement with said second sealing means when said second closing member is out of engagement with and second sealing means.

5. The valve of claim 4, wherein said shutter means comprises two shutter elements each having a through passage, including a first shutter element movable between a first position out of engagement with said first sealing means and a second position in engagement with said first sealing means, and a second shutter element movable between a first position out of engagement with said second sealing means and a second position in engagement with said second sealing means.

6. The valve of claim 1, wherein said shutter means is fixed relative to said closing means.

7. The valve of claim 1, wherein said shutter means is mounted for movement relative to said closing means.

8. The valve of claim 1, wherein the valve has a first position in which said closing means is out of engagement with said first sealing means and said second sealing means, and said shutter means is in engagement with said first sealing means and said second sealing means, and a second position in which said closing means is in engagement with one of said first sealing means and said second sealing means and out of engagement with the other of said first sealing and said second sealing means, and said shutter means is in engagement with said other of said first sealing means and said second sealing means.

9. The valve of claim 8, wherein the valve has a third position in which said closing means is in engagement with said first sealing means and said second sealing means, and said shutter means is out of engagement with said first sealing means and said second sealing means.

10. The valve of claim 1, wherein the through passage of said shutter element extends from one of said end casing parts to said middle casing part when said shutter means is in engagement with said first sealing means and said second sealing means.

11. The valve of claim 1, wherein said closing means comprises two closing members and a bar rigidly connecting said closing members.

12. The valve of claim 1, wherein said shutter means comprises two shutter elements, each said shutter element being mounted at a fixed distance from said closing means and defining with said closing means a flow passage having a first area, and said casing defines flow passages, each having a second area, between said first end casing part and said middle casing part and between said middle casing part and said second end casing part, said first area being substantially equal to said second area.

13. The valve of claim 1, wherein said shutter means comprises two shutter elements connected to one another to define a shutter element unit, and said closing means comprises two closing members, said shutter element unit being movably mounted between and relative to said closing members.

14. The valve of claim 13, further comprising means for mounting the shutter element unit for movement to a predetermined distance from each closing member to define with each closing member a flow passage having a first area, and said casing defines flow passages each having a second area between said first end casing part and said middle casing part and between said middle casing part and said second end casing part, said first area being substantially equal to said second area.

15. The valve of claim 13, wherein said closing means comprises two closing members, means extending between said closing members for connecting said closing members for movement relative to one another, and means extending between said closing members and surrounding said connecting means for separating said connecting means from the inner space of the casing, said connecting means comprising a flexible connection element.

16. A method for controlling a valve comprising
a casing including a first end casing part, a middle casing part, and a second end casing part arranged in series, said casing defining an inner space;
first sealing means for providing a seal between said first end casing part and said middle casing part, and second sealing means for providing a seal between said middle casing part and said second end casing part, at least one of said first and second sealing means comprising two seals disposed in series;
at least one leakage cavity in the inner space of said casing, said cavity being connected with the environment of the valve between the two seals of one of said first and second sealing means;
closing means engageable with said first sealing means for placing said middle casing part out of communication with said first end casing part and simultaneously engageable with said second sealing means for placing said middle casing part out of communication with said second end casing part, said closing means comprising at least one closing member; and
shutter means selectively engageable with either one of said first and second sealing means for providing fluid communication between a selective adjacent pair of said casing parts, said shutter means comprising at least one shutter member having a through passage, said shutter member selectively engaging one of said first and second sealing means to thereby provide said fluid communication between one of said pairs of adjacent casing parts, and said closing means selectively engaging the other of said first and second sealing means to block fluid communication between the other of said pair of adjacent casing parts, said closing means and said shutter means comprising means for selectively isolating said leakage cavity from the remainder of the inner space of said casing;
said method comprising:
moving said closing member between a first position in engagement with said first sealing means and a second position out of engagement with sealing means; and
moving said shutter element into engagement with said first sealing means when said closing member is in said second position.

* * * * *

UNITED STATES PATENT AND TRADEMARK OFFICE
CERTIFICATE OF CORRECTION

PATENT NO. : 4,995,416

DATED : February 26, 1991

INVENTOR(S) : Hans O. Mieth

It is certified that error appears in the above-identified patent and that said Letters Patent is hereby corrected as shown below:

```
Column 2, line 44, "each" should be deleted; and
         line 46, before "two", --each-- should be inserted.
Claim 2, line 2, before "comprises", --each-- should be inserted;
Claim 4, line 6, "and" should be changed to --said--; and
Claim 15, line 1, "13" should be --1--.
```

Signed and Sealed this

Twenty-second Day of September, 1992

*Attest:*

DOUGLAS B. COMER

*Attesting Officer*  *Acting Commissioner of Patents and Trademarks*